United States Patent [19]
Bayard

[11] 3,820,322
[45] June 28, 1974

[54] DEVICES FOR THE REGULATION OF A GAS-TURBINE TURBO-MACHINE OF LOW POWER

[76] Inventor: Gaston Bayard, 6 Place Wilson, Toulouse, France

[22] Filed: Nov. 7, 1972

[21] Appl. No.: 304,315

Related U.S. Application Data

[62] Division of Ser. No. 50,377, June 29, 1970.

[52] U.S. Cl............................................ 60/39.28 T
[51] Int. Cl. ............................................. F02c 9/04
[58] Field of Search ................. 60/39.28 R, 39.28 T

[56] References Cited
UNITED STATES PATENTS

| | | | |
|---|---|---|---|
| 2,933,887 | 4/1960 | Davies............................ | 60/39.28 T |
| 2,971,575 | 2/1961 | Williams ......................... | 60/39.28 R |
| 3,048,013 | 8/1962 | Bevers............................. | 60/39.28 T |
| 3,059,427 | 10/1962 | Thorpe............................ | 60/39.28 R |
| 3,063,239 | 11/1962 | Jensen............................. | 60/39.28 T |
| 3,156,291 | 11/1964 | Cornell ........................... | 60/39.28 R |
| 3,167,082 | 1/1965 | Oliphant ......................... | 60/39.28 R |
| 3,295,314 | 1/1967 | Matthews........................ | 60/39.28 R |
| 3,313,106 | 4/1967 | Matthews........................ | 60/39.28 R |

Primary Examiner—Carlton R. Croyle
Assistant Examiner—Robert E. Garrett
Attorney, Agent, or Firm—Charles E. Baxley, Esq.

[57] ABSTRACT

A method of and devices for the regulation of a turbo-machine comprising a compressor and a gas turbine of low power, into the combustion chamber of which is injected a pre-determined flow-rate of fuel, said method consisting of controlling the real flow-rate of injected fuel in dependence on an image of the absolute output pressure of said compressor, in such manner that the corresponding servo-control curve, for which the flow-rates of fuel are plotted in ordinates and the absolute pressures in abscissae, is located above the consumption curve of the turbo-machine corresponding to different stable conditions of operation. The image of the compressor output pressure is obtained by modulating said output pressure as a function of the speed of rotation of at least one rotating assembly of the turbo-machine, so as to reduce this pressure to a greater or less extent in order to obtain and maintain a stable point of operation corresponding to a pre-selected speed.

1 Claim, 3 Drawing Figures

DEVICES FOR THE REGULATION OF A GAS-TURBINE TURBO-MACHINE OF LOW POWER

CROSS REFERENCE

This application is a divisional application with respect to my copending application 50,377 filed June 29, 1970.

The invention relates to a method of regulation of a turbo-machine having a gas turbine of low power. It also relates to devices intended to carry this method into effect.

The invention is more particularly concerned with turbo-machines which fall into the two following classes:

Extraction turbo-reactors and turbo-generators, for which the speed of rotation of the compressor-turbine set is to be servo-controlled by a given order;

Free-turbine gas-generators, for which two speeds of rotation are to be considered: speed of rotation of the generator (compressor-turbine set) and speed of rotation of the free turbine (or power turbine).

The regulation of these turbo-machines with a gas turbine is intended, by acting on the flow of fuel injected into the combustion chamber, to obtain on the one hand correct setting to work at all points of the field of operation, and on the other hand the rapid and stable production of a pre-selected condition of operation.

Conventional regulation systems require complicated and costly apparatus, certain elements of which serve for the regulation during the starting-up stage and others for the regulation during working. This apparatus may comprise in particular a servo-motor, a tachometer regulator, a barometric corrector, etc.

The present invention is directed to provide a regulation of great reliability which only requires simple apparatus. This regulation makes it possible to obtain simultaneously correct setting to work at all points of the field of operation and the rapid and stable acquisition of a pre-selected condition of operation. The method according to the invention consists of controlling the real flow-rate of fuel injected by an image of the absolute output pressure of the compressor, so that the corresponding curve (hereinafter known as the "servo-control curve") in which the flow-rates of fuel are plotted in ordinates and the absolute pressures in abscissae, is located above the consumption curve of the corresponding turbo-machine at different stable speeds.

The image of the output pressure of the compressor is obtained by modulating the said output pressure, referenced $P_2$, as a function of the speed of rotation of at least one rotating assembly of the turbo-machine, so as to reduce this pressure more or less in order to obtain and maintain a stable point of operation corresponding to a pre-selected condition of working.

It should be noted that the pressures considered in the present specification are all absolute pressures. The image of the pressure $P_2$, referenced $BP_2$, summarizes the thermo-dynamic state of the machine. In fact, it brings into action the pressure $P_2$, which is variable with the surrounding conditions (and in consequence with altitude), and it is dependent on one or several speeds of rotation which are required to obey given orders.

For example, for a generator with a free turbine, the rotating units considered will be on the one hand the compressor-turbine set associated with the generator, and on the other hand, the free turbine (or the power turbine) of the generator.

Assume that at a given instant the turbo-machine rotates at a stable speed corresponding to an operating point located on its consumption curve. If an external disturbance causes a reduction of speed of one of the rotating assemblies considered, this reduction will be detected and will cause a modification of the image $BP_2$, resulting in an additional injection of fuel which will bring this speed back to the suitable value.

This will also be the case for an increase in speed.

The flow-rate of injected fuel is of course an increasing function of the image $BP_2$; this function may be substantially linear. The servo-control curve will then be a straight line, the position of which may be fixed by regulating the parameters of the servo-control device. This position will be modified at will by acting on two of these parameters, one acting for example on the slope of the straight line and the other on its ordinate at the origin.

When starting-up, the modulation of the pressure $P_2$ is zero. The point of operation (defined by its ordinate equal to the flow-rate of fuel and its abscissa equal to the output pressure of the compressor) moves on the servocontrol curve which is located as has been indicated, above the consumption curve of the turbo-machine; this is the acceleration phase. The position of this servo-control curve with respect to the consumption curve is determined (by regulating the parameters of the servo-control device) so as to avoid, during this phase of rapid acceleration, rich or poor extinctions together with excessive heating or the "hunting" of the compressor.

Upwards of a certain value, the speed of rotation of the rotating assemblies will cause a modulation of the pressure $P_2$. The image $BP_2$ of this pressure diminishes, causing a reduction of the injected flow-rate, while the pressure $P_2$ continues to increase as long as the operating point (ordinate: injected flow-rate $Q_i$; abscissa: pressure $P_2$) remains above the consumption curve. The curve described during this transient phase is a curve of negative slope located between the servo-control curve and the consumption curve. This transient curve reaches the consumption curve at a point of operation at which the speed of the turbo-machine will become stabilized. At this point, the modulation $P_2 - BP_2$ becomes constant, except as has already been seen in the event of an external disturbance. The injected flow becomes stabilized at a value corresponding to the ordinate of the point of the consumption curve for which the abscissa is $P_2$ (or alternatively to the ordinate of the point of the servocontrol curve for which the abscissa is $BP_2$).

According to a preferred form of embodiment, the servo-control of the flow-rate of fuel by the pressure $BP_2$ is effected by the extraction from a constant higher flow-rate of a variable flow-rate controlled by the pressure $BP_2$, in such manner that the servo-control curve satisfies the conditions already referred to.

The extraction may be effected in extraction injectors. The servo-control of the extracted flow-rate of fuel is advantageously obtained by passing this fuel through an orifice between the faces of which a constant pressure difference is maintained and which has a variable section which is a function of the image of the output pressure of the compressor.

It is known that the flow-rate passing through an orifice is proportional, on the one hand to the square root of the difference in pressure existing between its faces, and on the other hand to its section. In consequence, in the case considered, the extracted flow which is solely proportional to the section of the orifice traversed by the fuel, is controlled by the pressure $BP_2$.

The section of this orifice may be a decreasing, substantially linear function of the image of the output pressure of the compressor. In this case, it is easy to show (and this will be proved in the example described below) that the injected flow is a linear function of the pressure $BP_2$.

The invention also relates to a servo-control device for the flow-rate of a fluid at a control pressure particularly intended to permit the carrying into effect of the method previously described.

This device comprises:

An inlet conduit and an outlet conduit for the fluid;

A first slide-valve subjected to the constant action of a calibrated spring and capable of moving inside a first chamber which it separates into two fluid-tight cells.

A second slide-valve capable of moving inside a second chamber which communicates, through a first calibrated orifice, with the inlet conduit, and by a second calibrated orifice with the outlet conduit;

Pressure-detection means located in a chamber in which the control pressure exists.

According to the invention, this device also comprises:

Conduit means enabling the first slide-valve to be subjected to the pressure difference existing between the pressure in the second chamber and the outlet pressure;

Progressive closure means rigidly fixed to the first slide-valve and capable of covering to a greater or less extent the first orifice as a function of the position of equilibrium of the said first slide-valve;

Control means associated with the detection means and capable of moving the second slide-valve inside the second chamber for the purpose of fixing its position in dependence on the control pressure;

Progressive closure means rigidly fixed to the second slide-valve and capable of covering the second orifice to a greater or less extent, as a function of the position determined for this second slide-valve.

As will be proved in the example described below, this device is traversed by a flow-rate $Q_P$ which is a decreasing function of the control pressure: $Q_P = f(BP_2)$.

According to a preferred form of embodiment, the control means associated with the detection means are provided so as to determine displacements of the second slide-valve varying substantially in a linear manner as a function of the control pressure, the detection means being constituted in particular by an aneroid capsule. In this case, the flow-rate is a decreasing linear function of the control pressure.

A simple method of producing the above-mentioned device consists of providing an annular recess on the outer periphery of the first slide-valve, forming inside the first chamber a third lateral fluid-tight cell. Into this cell deliver on the one hand the inlet conduit and on the other hand the first calibrated orifice. The progressive closure means of this orifice are then simply constituted by a bevelled peripheral lip provided on the first slide-valve.

The invention also extends to a regulation unit for a turbo-machine, intended to carry into effect the method of regulation described. A regulation unit of this kind comprises:

A constant flow regulator supplied with fuel by a pump from a tank and providing at its outlet a constant flow-rate of fuel;

Extraction injectors each comprising on the one hand at least one injection orifice delivering into the combustion chamber of the turbine, and on the other hand at least one extraction orifice delivering into an extraction conduit;

At least one speed controller for a rotating assembly of the turbo-machine, capable of controlling the degree of opening of at least one valve for connection to free air;

A servo-control device similar to that which has just been described.

In addition, according to the invention, the unit comprises:

Conduit means connecting the outlet of the constant flow regulator to the inlet of the extraction injectors;

Coupling means between the extraction and inlet conduits of the servo-control device;

Return means connecting the outlet of the servo-control device to the tank;

Means acting through the intermedialy of a calibrated capillary for putting the chamber comprising the detection means provided in the servo-control device into communication with the delivery zone at the outlet of the compressor;

Means for putting the above-mentioned chamber into communication with free air, through the intermediary of valves operated by the speed-control devices.

Other characteristic features, objects and advantages of the invention will be brought out in the description which follows below with reference to the accompanying drawings, the description and drawings being given solely by way of example and not in any limitative sense. In the drawings.

Figure 1:
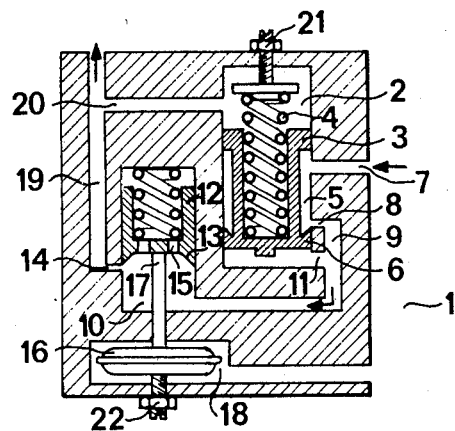
FIG. 1 is a simplified diagram of a servo-control device for a flow-rate of fluid, actuated by a control pressure.

The simplified diagram of FIG. 1 makes it possible to understand the principle of a servo-control device 1 of a flow-rate of fuel (alternatively known as a flow-rate dosing device). In a first chamber 2 of the device, a moving slide-valve 3 is subjected:

on the one hand to the constant action of a calibrating spring 4;

on the other hand to the difference in pressure existing between its faces.

The slide-valve 3 has a lateral recess 5 and, at one extremity, a bevelled peripheral lip 6. An inlet conduit 7 for the fuel delivers into the interior of the recess 5. In addition, at the level of the bevelled lip 6, a calibrated orifice 8 puts the recess 5 into communication with a conduit 9 which brings the fuel towards a second chamber 10. A pressure-application opening 11 enables one face of the slide-valve 3 to be subjected to the pressure existing in the chamber 10.

The chamber 2 thus comprises three zones subjected to different pressures:

The recess 5 subjected to the inlet pressure $P_e$ of the fuel;

A zone (on the side of the face of the slide-valve opposite to the spring 4) subjected to the pressure of the chamber 10 which will be known as the intermediate pressure $P_i$;

A zone (on the side of the face of the slide-valve on which the spring 4 acts) subjected, as will be seen, to the outlet pressure $P_s$ of the fuel.

The pressure $P_e$ has no action on the slide-valve 3. The equilibrium of this slide-valve corresponds to the position at which its lip 6 covers the orifice 8, so that the variable force due to difference in pressure is equal to the constant force applied by the spring. In consequence, we have:

$$(P_i - P_s)S = F_r$$

in which S is the surface of the faces subjected to the pressures $P_i$ or $P_e$, and $F_r$ is the substantially constant thrust force of the spring. It can therefore be seen that the slide-valve 3 maintains constant the pressure difference $P_i - P_s$:

$$P_i - P_s = F_r/S = \text{substantially a constant.}$$

Furthermore, in the chamber 10, another moving slide-valve 12 is capable, by means of a bevelled lip 13, of covering a calibrated orifice 14. The pressure in the chamber 10 is uniform by virtue of the openings 15. The movements of this slide-valve 12, subjected to the action of a return spring, are controlled by an aneroid capsule shown diagrammatically at 16, by means of a connecting shaft 17.

The capsule 16 is located in a chamber 18 in which exists the control pressure designated by $BP_2$. These arrangements make it possible to obtain, except for small values of $BP_2$, movements of the slide-valve 12 which are substantially proportional to this pressure $BP_2$. Thus, to a large pressure $BP_2$ there will correspond a large displacement of the slide-valve and therefore a considerable closure of the orifice 14. The section s of this orifice is thus a decreasing linear function of the pressure $BP_2$.

$$s = s_0 - a \cdot BP_2$$

The orifice 14 opens into an outlet conduit 19 in which exists an outlet pressure $P_s$. This pressure $P_s$ is applied, by means of a conduit 20, to one of the zones of the chamber 2 (the zone on the side of the slide-valve face on which the spring 4 acts).

Screw devices shown diagrammatically at 21 and 22, the choice of the spring 4, of the calibration of the orifices 8 and 14 and the dimensions of the slide-valve 3 make it possible to fix the parameters S, $F_r$, $S_0$ for each particular application, giving the relations: $P_i - P_s = F_r/S = $ a constant and $s = s_0 - a \cdot BP_2$.

The flow-rate of fuel which passes through the orifice 14 is: $D = k \cdot s \cdot \sqrt{(P_i - P_s)}$, since s is the section of this orifice and $P_i$ and $P_s$ are the pressures which are applied against its faces. It has been seen that the pressure difference $P_i - P_s$ is kept constant by the action of the slide-valve 3 on the orifice 8. In consequence:

$$D = B \cdot (s_0 - a \cdot BP_2)$$

in which B, $S_0$ and a are constant parameters.

It can therefore be seen that the device according to the invention controls a flow-rate D of fuel in dependence on a control pressure $BP_2$ following a decreasing, substantially linear function. FIG. 1 is obviously only a basic diagram of this device, but this diagram will will readily enable those skilled in the art to produce an actual device.

There will now be considered a special application of such a servo-control device intended for the regulation of a gas-turbine turbo-machine of low power.

The regulation of turbo-machines consists of acting on the flow-rate of fuel injected into the combustion chamber of the turbine, so as to obtain simultaneously a correct setting to work at all points of the field of operation and the rapid and stable acquisition of a preselected condition of operation. According to the invention, the control pressure by which the flow-rate of injected fuel is controlled, is an image of the output pressure of the compressor of the turbo-machine. This image is obtained by modulating this output pressure as a function of the speed of rotation of at least one rotating assembly of the turbo-machine.

In the case of a turbo-reactor, for example, this speed will be the speed of rotation of the compressor-turbine unit.

For the case of a turbo-generator with a free turbine, two rotating assemblies may be taken into consideration:

The assembly comprising the compressor and associated turbine wheels;

The free turbine, acting as a starting-up device for a main engine.

In this case, the output pressure of the compressor is modulated so as to obtain a stable operating point corresponding to a pre-selected speed and to limit the speed of rotation of the free turbine to values compatible with the correct operation of the machine.

Figure 3:
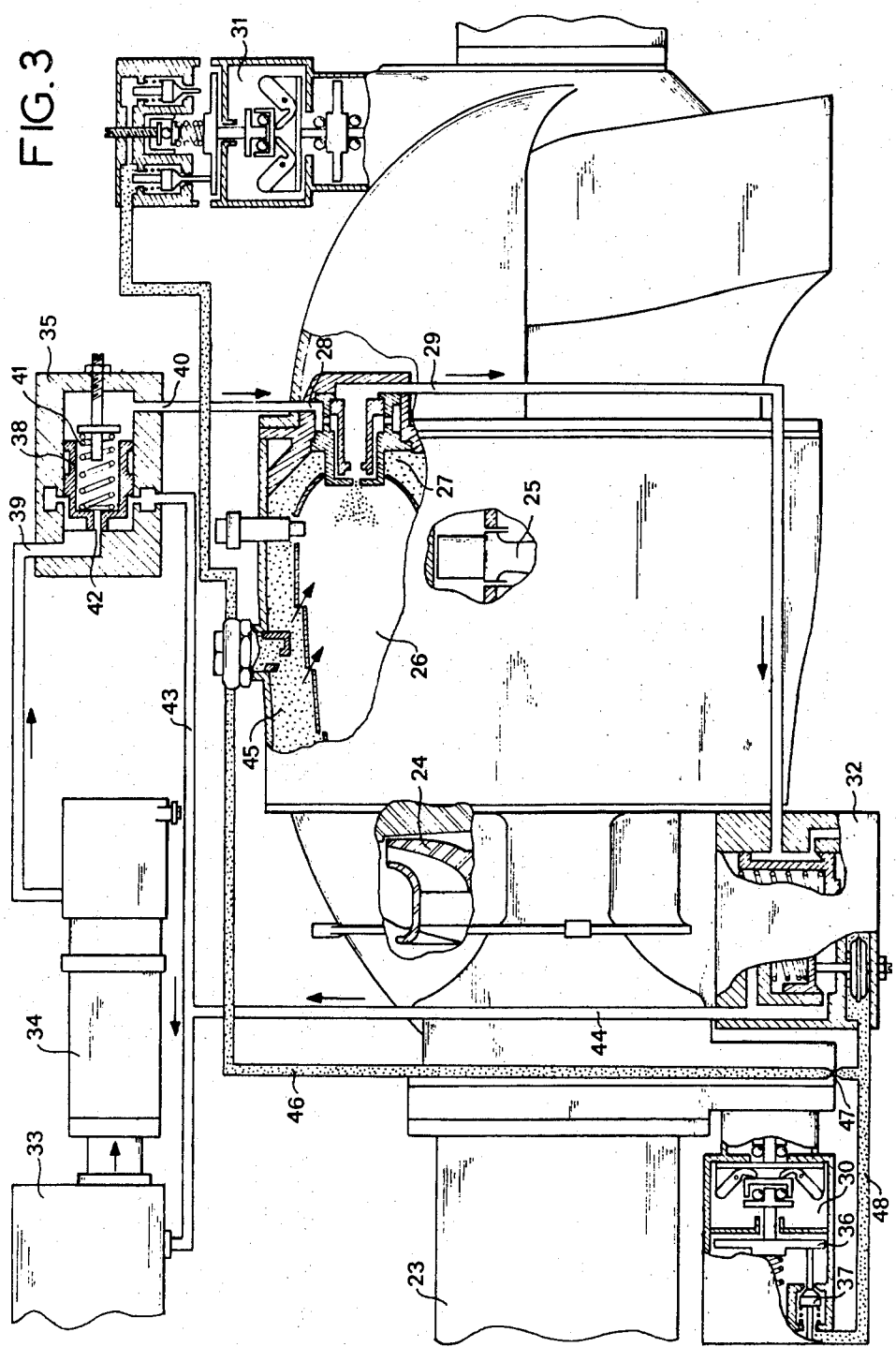
FIG. 3 is a diagram of a gas-turbine generator provided with a regulation unit according to the invention.

By way of non-limitative example, there will now be studied in more detail, with reference to FIG. 3, the case of the regulation of a turbo-generator with a gas turbine of low power.

In order to simplify the description and the drawing, only the parts which are directly concerned with the regulation according to the invention, have been referred to or shown. For example, conventional parts such as non-return valves, electro-valve, fire-guard, filter, electro-gate, etc. have been deliberately omitted.

A generator with gas turbine (FIG. 3) comprises essentially:

An electric motor for running-up to speed at 23;

A rotating assembly formed by the compressor 24 and the associated turbine wheels;

A second rotating assembly comprising the free turbine serving to start-up a main engine, and of which a wheel 25 is shown;

Fixed members: diffuser, straightener, distributors, etc.;

A combustion chamber 26 of the annular elbowed type, supplied with fuel by extraction injectors 27 arranged on the rear-end-plate which comprises a supply pipe shown diagrammatically at 28 and an extraction or return pipe 29;

A speed-control device 30 for the rotating assembly of the generator;

A speed-control device 31 for the free turbine;

A servo-control device 32 such as previously described and which will be known for this application as the flow-rate dosing device;

A fuel tank 33;

A fuel pump 34;

A constant-flow regulator 35;

and of course the ignition, operating and control circuits which are not shown in FIG. 3.

The speed-control devices 30 and 31 are of the standard type with fly-weights: one is driven by the gas generator and the other by the free turbine. The movement of their regulator plate (shown at 36) is a function of the speed of rotation of the associated rotating assembly. Each of these plates acts on valves (such as that shown at 37), for connection to free air. The balancing springs of the plates and the valves permit regulation of the amount of modulation effected on the output pressure of the compressor.

The constant-flow regulator 35 comprises a slide-valve 38 subjected on the one hand to the pressure difference between the inlet of fuel at 39 and the departure to the injectors at 40, and on the other hand to the constant action of a calibration spring 41. The communication between the outlet and the intake is effected through a calibrated orifice 42. The position of equilibrium of the slide-valve 38 corresponds to the equality of the constant action of the spring and the difference in pressure. This pressure difference is thus constant, and the calibrated orifice 42, the faces of which are subjected to a constant difference of pressure and the section of which is constant, allows a constant flow-rate $Q_e$ to pass. The excess fuel is sent back to the tank through a conduit 43.

The extraction injectors 27 are constituted by a turbulence chamber supplied through peripheral nozzles with fuel coming from the outlet 40 of the constant-flow regulator. This turbulence chamber comprises two axial orifices, one delivering into the combustion chamber 26 (flow-rate of fuel injected = $Q_i$), the other into the extraction conduit 29 (flow-rate of extracted fuel = $Q_p$). The flow-rate of injected fuel is obviously equal to the difference between the flow $Q_e$ of incoming fuel and the extracted flow-rate $Q_p$:

$$Q_i = Q_e - Q_p$$

The extracted fuel is led through the conduit 29 to the inlet of the proportioning device 32. The outlet of this device is connected through a conduit 44 to a return conduit to the tank 33.

In addition, the aneroid capsule of the proportioning device is subjected to a pressure $BP_2$, image of the pressure $P_2$ existing in the delivery chamber 45 of the compressor. In fact, the chamber in which this capsule is housed is put into communication with:

the delivery chamber 45 through a conduit 46 comprising a capillary 47 which introduces a delay in the establishment of the pressure $P_2$;

the valve for connecting the speed-control device of the generator 30 to free air through a conduit 48;

the valve for connecting the speed-control device 31 of the free turbine to free air. It has been seen that the expression of the flow-rate passing through the proportioning device 32 is of the form:

$$Q_p = K_1 - K_2 \cdot BP_2$$

in which $K_1$ and $K_2$ are constants and $BP_2$ is the pressure which exists round the aneroid capsule. For the flow-rate of injected fuel there is thus obtained:

$$Q_i = Q_e - Q_p = K_2 \cdot BP_2 + K_3$$

The injected flow-rate $Q_i$ is therefore an increasing linear function of the image of the outlet pressure of the compressor $BP_2$.

Figure 2:
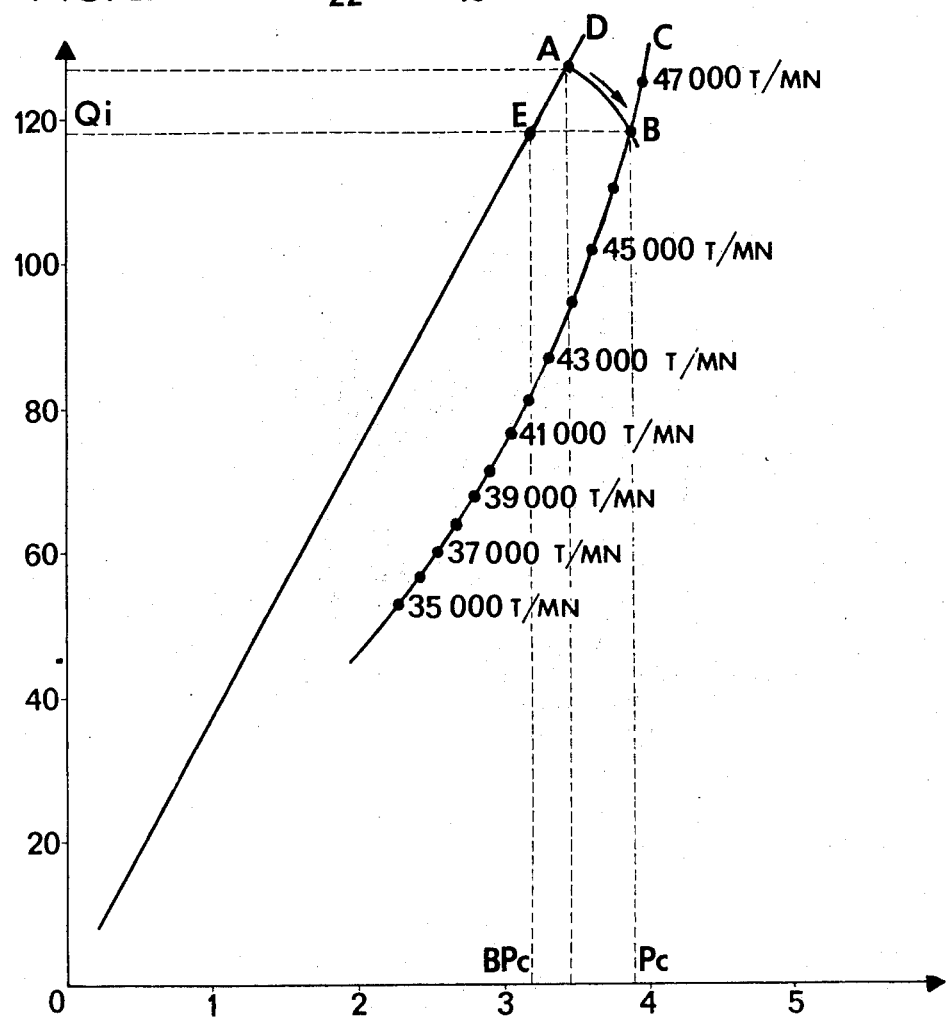
FIG. 2 is a diagram composed of a servo-control straight line D and a consumption curve C of a gas-turbine generator for different stabilized speeds.

FIG. 2 shows, in a diagram for which the flow-rates are plotted in ordinates and the absolute pressure in abscissae, the straight line D or servo-control line, giving the injected flow-rate as a function of the pressure $BP_2$. In addition, on this diagram is drawn the consumption curve C of the generator for different stabilized speeds (between 35,000 r.p.m. and 47,000 r.p.m.).

The slope $K_2$ of the straight line D and the constant $K_3$ may be chosen, as has already been indicated, by regulating the parameters such as: calibration of springs, calibration of orifices, initial positioning of the aneroid capsule, surface of the slide-valves, etc. In practice, as the other parameters are adjusted once and for all, the tension of the spring 4 provided on the proportioning device 32 will permit the slope of the straight line D to be regulated, while the adjustment of the initial position of the aneroid capsule will enable this straight line to be displaced parallel to itself.

In the example chosen, these two parameters will be regulated in such manner that the straight line D is located above the consumption curve C, as shown on the diagram.

The point B of operation of the gas generator is fixed by calibrating the speed control devices 30 and 31. Considering the running-up to speed of the gas generator:

During the starting-up phase, the speed-control devices do not act on the associated valves and the pressure $P_2$ is not modulated; we have: $BP_2 = P_2$.

The point of operation thus moves along the straight line D; this is the acceleration phase. When the point A is reached (having the ordinate $Q_iA$ and the abscissa $BP_2\ A = P_2A$), the speed-control devices cause the opening of the associated valves. The modulated pressure $BP_2$ then diminishes, while the pressure $P_2$ continues to increase as long as the point of operation is above the consumption curve C. The point of operation described the curve AB.

At the operating point B, the output pressure of the compressor is $P_2$ (B), and the pressure acting on the capsule is $BP_2(E)$. The point B on the curve C corresponds to a stable point of operation. The abscissa of the point E (having the same ordinate at B and located on the straight line D) corresponds to the pressure image $BP_2$ which acts on the capsule. The difference $P_2 - BP_2$ is the modulation continuously introduced at this point of operation by the speed-control devices.

In the case where an external disturbance causes a reduction or an increase in the speed of the generator, the image $BP_2$ would be subjected to a modulation (an increase or a reduction respectively) which would bring the generator back to its correct speed. Similarly, in the case of excessive or inadequate speeds of the free turbine, the image $BP_2$ would be modulated so as to restore the speed to a suitable value.

There can thus be seen the advantage of the regulation system described which, by means of simple apparatus, permits correct starting-up to be effected at any point of the field of operation (and thus irrespective of the external pressure and in consequence the altitude) and the rapid and stable acquisition of a pre-selected condition of operation.

It will of course be understood that the invention is in no way limited to the examples described and shown; it is capable of assuming numerous alternative forms within the scope of those skilled in the art, according to the applications considered, which form part of the scope of the invention.

What I claim is:

1. A regulation system for a turbo-machine and comprising:
   a constant flow regulator, supplied with fuel by a pump from a tank and providing at its outlet a constant flow-rate of fuel;
   extraction injectors each comprising on the one hand at least one injection orifice opening into the combustion chamber of the turbine, and on the other hand at least one extraction orifice opening into an extraction conduit;
   at least one control device for controlling the speed of a rotating unit of said turbo-machine, adapted to control the degree of opening of at least one valve for putting into communication with free air;
   a servo-control device for controlling a flow-rate of fluid in dependence on a control pressure and including:
   an intake conduit and an outlet conduit for the fluid;
   a first slide-valve, subjected to the constant action of a calibrating spring and adapted to move inside a first chamber which it divides into two fluid-tight cells;
   a second slide-valve adapted to move inside a second chamber, said second chamber communicating through a first calibrated orifice with the intake conduit, and through a second calibrated orifice with the output conduit;
   pressure-detection means located in a chamber in which exists the control-pressure;
   conduit means adapted to subject said first slide-valve to the pressure difference existing between the pressure of said second chamber and said output pressure;
   progressive closure means rigidly fixed on said first slide-valve and adapted to close said first orifice to a greater or less extent, as a function of the position of equilibrium of said first slide-valve;
   control means associated with said detection means and adapted to move the second slide-valve in said second chamber in order to fix its position in dependence on said control pressure;
   progressive close means fast with said second slide-valve and adapted to cover said second orifice to a greater or less extent, as a function of the position determined for said second slide-valve;
   said control means associated with said detection means in order to determine displacements of said second slide-valve varying in a substantially linear manner as a function of the control pressure, said detection means being constituted in particular by an aneroid capsule;
   said first slide-valve comprises an annular recess on its outer periphery forming a third fluid-tight lateral cell in said first chamber into which deliver on the one hand the intake conduit and on the other hand the first calibrated orifice, the progressive closure means for this orifice being constituted by a bevelled peripheral lip provided on said first slide-valve;
   conduit means for connecting the outlet of said constant-flow regulator to the inlet of said extraction injectors;
   connection means between the extraction conduits and the inlet of said servo-control device;
   return means connecting the outlet of said servo-control device to the tank;
   means acting through the intermediary of a calibrated capillary for putting the chamber comprising said detection means provided on said servo-control device into communication with the delivery zone at the outlet of said compressor;
   means for putting the above specified chamber into communication with free air through the intermediary of valves operated by said speed-control devices.

* * * * *